United States Patent Office 3,023,828
Patented Mar. 6, 1962

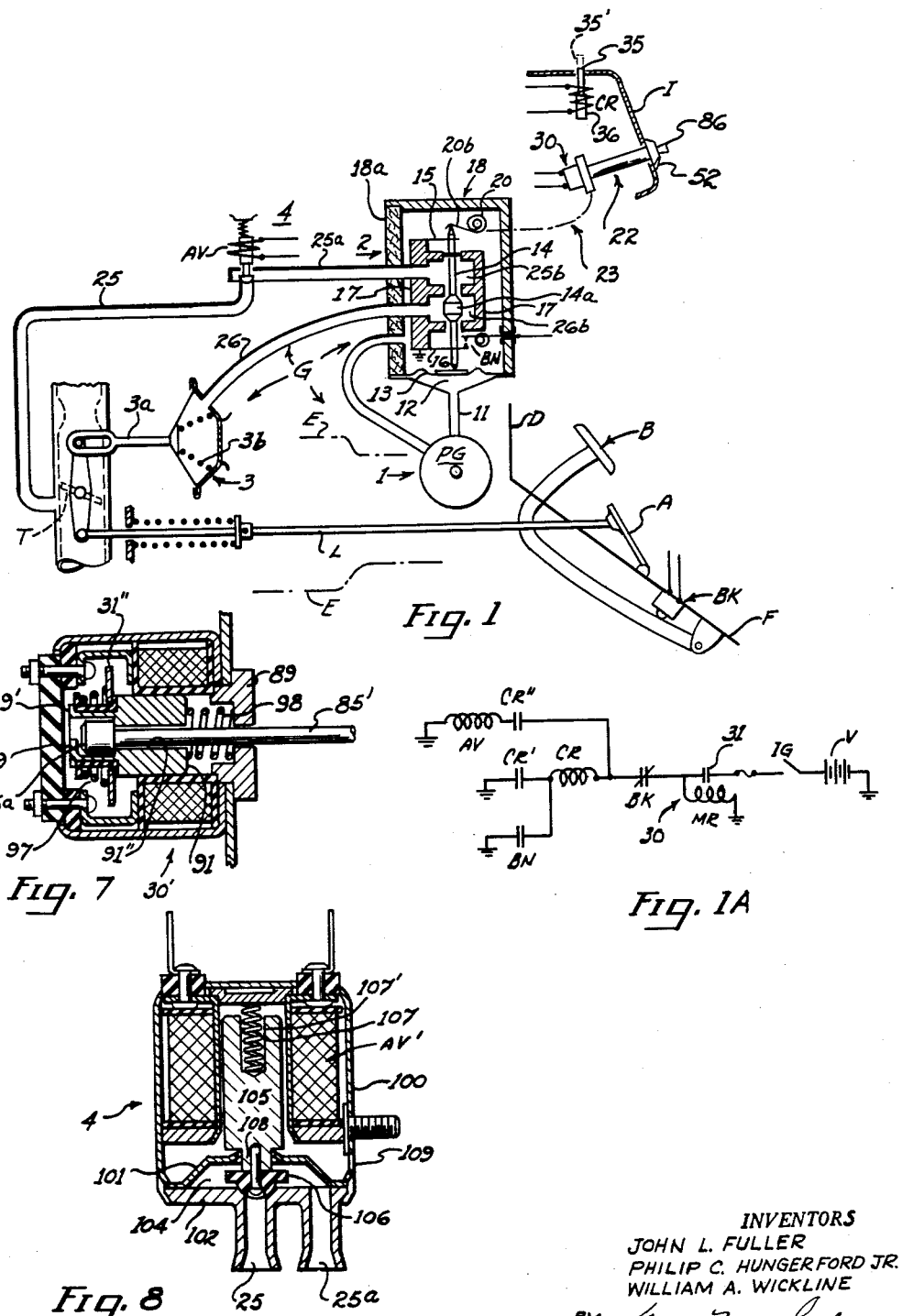

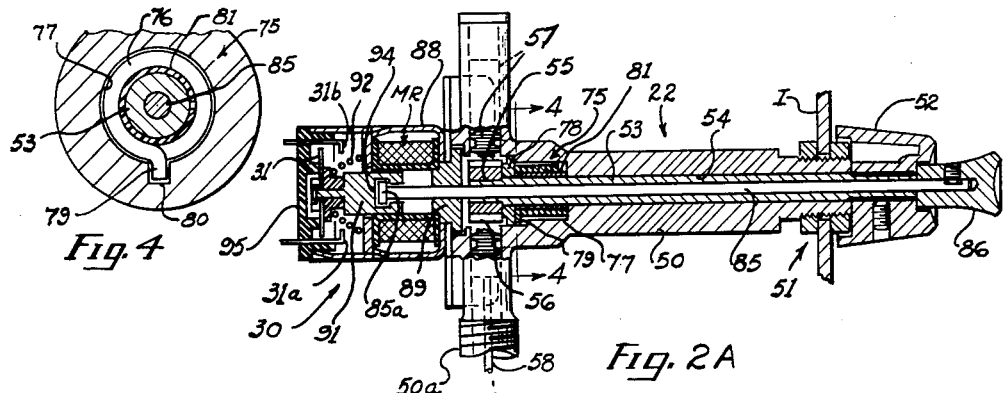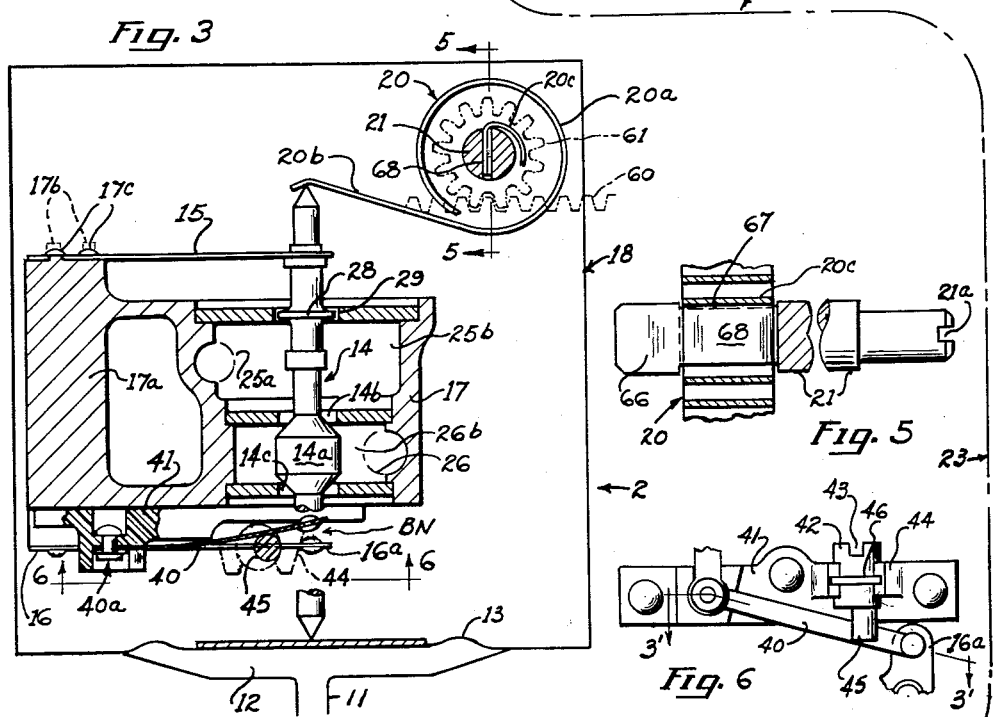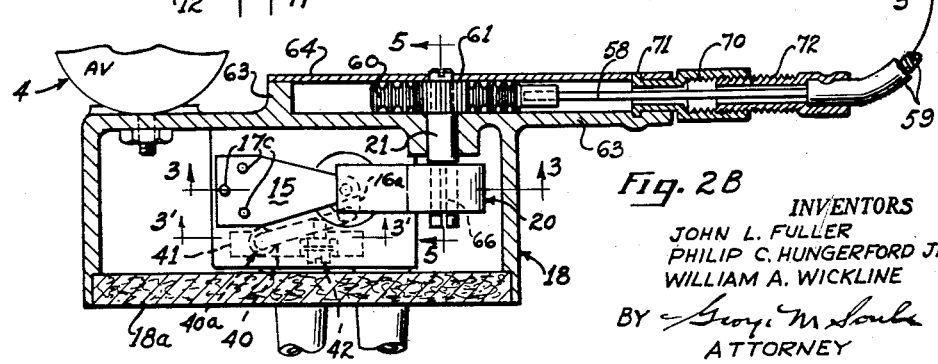

3,023,828
SPEED REGULATING GOVERNORS AND CONTROL MECHANISMS THEREFOR
John L. Fuller, Shaker Heights, Philip C. Hungerford, Jr., Cleveland Heights, and William A. Wickline, Willowick, Ohio, assignors to Curtiss-Wright Corporation, a corporation of Delaware
Filed Oct. 15, 1959, Ser. No. 846,586
11 Claims. (Cl. 180—82.1)

The principal objects of the present invention are to provide an improved control system and mechanism for a governor adapted to serve as a road speed regulator on an automotive vehicle engine and to provide certain improvements in governors adapted for road speed regulation.

The governor mechanism shown herewith is generally similar to that shown in United States Patent of John L. Fuller and William A. Wickline, No. 2,990,825 issued July 7, 1961 entitled Speed Regulator Systems or Mechanisms. In such system, installations of the basic governor components are customarily made in the engine house forwardly of the cab space and firewall (assuming conventional or forward engine installation) for connection to the engine throttle valve or other engine control means, and the governor as usual has a speeder spring whose operating force, as on a governor pilot valve, must be selectively adjustable by the driver while driving so that the governor at desired times at the will of the driver will assume automatic control of the engine at operator-selected speeds. It is important that the driver be provided with conveniently located means to activate and deactivate the governor mechanism at will, and preferably the activating and deactivating control means and the governor speed setting means are positioned within reach of the driver at a substantially common location within the cab. It is, of course, desirable that the operator can at any time override the governor for emergency acceleration purposes; that the governor be completely deactivated when the usual vehicle stopping operations by the driver are performed; and that after overriding and/or deactivation, as by use of the brakes, the governor be automatically reactivated without requiring manual reset. All the necessary manual and automatic operations referred to above are arranged to be effected by safe and simple means by the use of the present invention as will be described below.

Objects and features of the invention not indicated above will be brought out in the description of the preferred forms and relationships of components shown in the drawings. The essential characteristics are summarized in the claims.

In the drawings FIG. 1 is a largely schematic view showing a typical installation of the governor and its controls on a forwardly mounted vehicle engine E, the view showing diagrammatically most of the electrical control devices as preferably used. FIG. 1A is a diagram complementing FIG. 1 in respect to the electrical components and suitable circuit relationships therebetween.

FIGS. 2A and 2B are principally cross sectional full scale views respectively of a manual control assembly including a make-ready relay electrical switch mechanism and an automatic governor pilot valve unit and speeder spring adjusting mechanism embodied therewith.

FIG. 3 is a partly diagrammatical greatly enlarged scale view showing the pilot valve unit in vertical cross section and a speeder spring assembly according to FIG. 2B, the sectionally shown parts being as indicated by the line 3—3 on FIG. 2B.

FIG. 4 is a double scale sectional view of a helical friction spring brake, taken as at 4—4 on FIG. 2A.

FIG. 5 is a greatly enlarged sectional view of a speeder spring adjusting rock shaft and associated portions of the speeder spring.

FIG. 6 is a bottom plan view of an electrical switch assembly operated by the pilot valve of the governor, the point of view being indicated at 6—6 in FIG. 3.

FIG. 7 is a central sectional fragmentary enlarged scale view showing a modified form of make-ready relay mechanism similar to that shown at the left in FIG. 2A.

FIG. 8 is a central longitudinal sectional view of an electrically operated air valve assembly or unit for admission of motivating fluid to the governor pilot valve mechanism at proper time and to terminate admission of operating fluid.

General Arrangement

The basic or principal working components of the governor mechanism G in FIG. 1 (arranged and operating as a pneumatic amplifier) are a centrifugal speed signal producing pressure generator unit 1 driven as by a transmission unit, not shown, attached to the engine E; a speed sensing and pilot valve unit 2; a servo or motor unit 3, and an actuator or energizer unit 4 for the governor in the form of an electrically operated air valve, the operating coil of which is identified AV. All the components mentioned may be combined for installation into a single unit. The components can operate in any position, hence terms "up," "down" and the like are solely for reference purposes.

The speed signal pressure generator unit 1 may be inserted and connected between separated portions of the automobile speedometer cable as fully illustrated or described in said Fuller et al. application. Elastic fluid output of generator 1, via tube 11, is delivered to a signal receiving diaphragm chamber 12 of pilot valve unit 2, one movable wall of the chamber being conventionally shown as a flexible diaphragm 13. Diaphragm 13 acts on a substantially friction free pilot valve mechanism in unit 2 the principal part of which mechanism is a valve plunger 14 supported by leaf springs 15 and 16 attached to a rigid valve body member 17 inside a suitable generally closed housing 18. Valve plunger 14 will hereinafter for convenience usually be referred to as the pilot valve.

Governor speeder spring 20 is supported in the housing 18 on a rock shaft 21 (cf. FIGS. 3 and 5) and, as shown, has an open spiral spring formation 20a and an operating arm 20b having a more or less friction free connection with the top end of the pilot valve 14 so that energy stored in the speeder spring pursuant to adjustment of the rock shaft 21 opposes and, during governor operation, steadily balances the upward force exerted on the pilot valve by fluid in the speed sensing diaphragm chamber 12.

A manual governor control assembly 22, FIG. 1, mounted for example on the instrument panel or dash I of the automobile operates through a flexible push-pull assembly diagrammatically indicated at 23, FIGS. 1 2A and 2B to vary the operating force of the speeder spring 20 by adjusting the shaft 21. One readily demountable wall 18a of generally closed housing 18 for valve body 17 forms a filter for admitting clear air to the inside of the housing 18.

Servo unit or motor 3, FIG. 1, operates the engine throttle valve T through a lost motion connecting rod 3a and is operated by engine vacuum in the throttle opening direction against the resistance of a return spring 3b, the vacuum via conduit 25, 25a being applied to the servo via conduit 26 under control of the pilot valve 14, as in said prior application. The intensity of engine vacuum in vacuum chamber 25b of valve body 17, hence in servo 3, is increased by lowering movement of a plug portion 14a of the plunger 14 (further opening port 14b, FIG. 3), and is decreased by upward movement of the plug portion which restricts port 14b and simultaneously enlarges the area of air inlet port 14c. Thus upward port-closing movement of the plug reduces the engine-supplied actuating force to zero and concurrently admits air at atmospheric pressure from inside the housing 18 substantially unrestrictedly to the working chamber of the servo 3, via air valve chamber 26b. A compensating disc 28 movable freely in an orifice 29 in the top wall of the valve body 17 equalizes vacuum forces on the valve plunger axially thereof so that variations in vacuum with load do not undesirably unbalance or bias the pilot valve axially, as more fully explained in the said Fuller et al. application. Foot accelerator A is connected to throttle T through a spring returned link L, and operation of the accelerator pedal can override the governor servo 3 for emergency speed purposes at any time in view of the lost motion connection 3a thereof with the throttle.

Electrical Controls

As shown in FIG. 1A, a source of electrical energy V is primarily controlled by ignition switch IG via a suitable fuse to a make-ready relay mechanism 30 the coil MR of which when energized by manual closing of normally open contacts 31 maintains those contacts closed. Normally closed contacts of a brake pedal operated switch BK in the circuit are opened to deactivate the governor whenever the brake pedal is depressed slightly while driving. Relay coil CR (for clicker relay), when energized, holds normally open contacts CR' and CR'' closed thereby enabling electro-magnetic operation to open the air valve 4, FIG. 1, for communication of the vacuum conduit 25 with the vacuum chamber 25b of the pilot valve unit 2. However, since the contacts CR' and CR'' are normally open, the coils CR and AV are energized only when a pair of normally open switch contacts BN located in the pilot valve unit and operated by the pilot valve 14 are closed; and reopening of contacts BN has no effect on contacts CR' and CR'' since closing of those contacts establishes a holding circuit through coil CR as will be evident. The switch mechanism containing contacts BN is delicately made and infinitely adjustable; and, in the illustrated circuit, is subjected to relatively low current due to the resistance of coil CR in series therewith, whereby contact point life is prolonged.

Clicker relay coil CR through movement of its armature to either of two stopped positions serves as an audible signal when contacts BN are closed in a raised position of the pivot valve 14 from the position it occupies when there is little or no signal pressure in diagram chamber 12 to a fluid controlling position in reference to associated valve ports as determined by the then adjusted condition of the speeder spring 20. Thus the contacts BN are closed in accordance with selected governing speed whereupon energization of coil AV of the air valve device 4 establishes communication of the engine fuel induction pipe and the pilot valve chamber 25b for activation of the governor to regulate the vehicle speed, and sound (click) produced by operation of the armature of coil CR to a suitable stop informs the driver that approximately the selected speed has been attained.

When the signal denoting governor activation is constituted by a single click such signal can be rendered imperceptible at times by traffic noise. As schematically shown at the top of FIG. 1 a stem portion 35 of the movable element, e.g. armature 36, of the clicker relay (or a motion amplifying lever operated thereby if the armature stroke is very short) is aligned with an opening in an upwardly exposed portion of the instrument panel or dash I, and is so designed as to serve as a visual signal (e.g. by projecting upwardly as at 35') when the relay coil CR is energized. When the governor is deactivated, as by opening of the brake pedal switch BK or by manual opening of make-ready contacts 31, relay coil CR is deenergized, a second click occurs and the extension 35 disappears or is moved flush with or below the panel face.

Pilot Valve Construction

In FIG. 2B and double scale views FIGS. 3 and 6, the leaf spring supports 15 and 16 for the pilot valve plunger 14 of mechanism 2, are generally as shown in said Fuller et al. application except that the leaf springs are secured to the portion 17a of the valve body 17 by a plurality of rivet-forming projections integral therewith and initially extending as in broken lines 17b in FIG. 3. The projections 17b snugly enter corresponding openings in the leaf springs 15 and 16 and are finally tightly riveted over (as by a single operation for both springs) to position 17c. Additional openings in the leaf springs near their free ends, during installation of the pilot valve plunger 14, more or less loosely embrace corresponding stem portions of the valve plunger. The leaf springs 15 and 16 are fixed to those stem portions as by solder when the valve plunger has been precisely located in coaxial relationship to the valve ports or orifices 14b and 14c and with the compensating disc 28 completely out of contact all around it with the orifice 29. Except for the manner of fastening the leaf springs to the valve body 17, the procedure in assembling the various pilot valve components is or can be the same as described in said Fuller et al. application.

Pilot Valve Operated Contacts BN

Operation of the delicately constructed and very small pilot valve mechanism 2 in order to close the contacts BN of the circuit described in connection with FIG. 1A precisely when the vehicle has arrived at a predetermined speed, as chosen by the setting of the speeder spring 20, requires a very delicately constructed switch mechanism and precise adjustment of its contacts in relation to pilot valve travel, plus other important considerations outlined below.

The travel of the pilot valve through its full range from lower port closing position to upper port closing position is in the magnitude of .030"; and the net force change required to move the pilot valve through that range is in the magnitude of 12 grams. Therefore the amount of pilot valve movement necessary to effect full metal-to-metal closing of the contacts BN must be minimized; infinitely small adjustment increments are required to set the contacts so that they will be closed at the proper point in pilot valve movement, and the force required to close the contacts must be a relatively small percentage of the force which acts as a function of vehicle speed to move the pilot valve from one position to another. If a fairly large percentage of the speed function force were to be required for closing the contacts, the governed engine speed would be undesirably modified by switch spring force during the switch contact closing operation and as long as the contacts BN are held closed. A light gauge leaf spring supporting one of the contacts BN and mounted as a cantilever can be designed with the necessary length to have a desirably limited spring force, or just enough to break through oxide or other film (about three grams); but if a sufficiently light gauge or low rate leaf spring were to extend normally the required distance from the centilever support it would tend undesirably to vibrate or flutter and have erratic circuit closing action and, additionally, the pilot valve would have to move a considerable distance after physical engagement of the contacts and before the circuit is certain to be established by attainment of the necessary minimum contact pressure.

In the present leaf spring switch mechanism in pilot valve unit 2 a contact-position precisional adjustment device maintains the contact-supporting leaf spring in a desirably preloaded condition and in such manner that the switch is not subject to erratic action by vibration and so that contact closing pressure is increased at a high rate or abruptly with a practically insignificant amount of pilot valve movement once the contacts touch each other.

It may be of interest at this point to note that while the vehicle is being initially accelerated, as by manual operation of the accelerator pedal A, the force of the speeder spring 20, as set by the operator to predetermine the desired governing speed, holds the pilot valve plunger 14 in a position such that the electrical contacts BN are separated a substantial distance (e.g. valve plug position 14a seated in lower orifice 14c) and the speed function pressure force in diaphragm chamber 12 becomes sufficient to balance the set speeder spring force and lift the pilot valve only when the thus preselected governing speed has been attained by the vehicle.

As shown by comparison of FIGS. 2B, 3 and 6 the light leaf spring arm 40 carrying one of the contacts BN is supported and attached by a binder rivet assembly 40a to an insulating (e.g. nylon) block or base 41 suitably attached as by screws to the underside of the valve body 17 at one side of the pilot-valve-supporting leaf spring 16. A short, hence substantially stiff lateral extension 16a of the leaf spring 16, as shown particularly by FIGS. 2B and 6, carries the cooperating contact BN so that the position of the pilot valve operated contact is strictly or substantially a function of pilot valve position. An angularly adjustable generally cylindrical pin 42 (e.g. nylon) having an eccentric pin portion 45 is supported so as to be held strongly in adjusted position by friction in a somewhat diametrally undersized mutilated bore or socket formed in part between resilient arm portions 44 integral with the insulating block or base 41. Pin 42 has an adjusting-tool-receiving slot 43 exposed adjacent the removable filter wall 18a of the pilot valve housing (see FIG. 2B) and may be retained against axial displacement by a circular flange 46 on the pin in a mating recess formed partly between the spring arm portions 44. The location of the eccentric pin portion 45 relative to the contacts is such that with the leaf spring 40 deflected by the eccentric pin 45 as shown in FIG. 3 (e.g. 3 grams preloading) a very short effective free cantilever arm portion of the spring (e.g. same effective length as extensions 16a) carries its contact in adjusted position spaced apart from the contact carried by extension 16a of valve supporting leaf spring 16. The necessary adjustment is through too short a range to vary the preloading of spring 40 susbtantially. It is apparent that the free cantilever arm is too short to be subjected perceptibly to vibration-induced flutter and that, assuming the pilot valve plunger 14 is shown in FIG. 3 as having been moved upwardly by speed sensing pressure in diaphragm chamber 12 to approximately its proper governing position for set speed, then (after the contacts are brought together) metal-to-metal conductive contact will be established by an almost insignificant further upward movement of the pilot valve. Adjustment of the contact-positioning eccentric pin 45 is usually accomplished on a test bench with suitably gauged air pressures connected to simulate a final installation.

*Make-Ready Relay and Speed Adjusting Head Assembly*

Referring to FIG. 2A the supporting body for above entitled assembly is a housing 50 adapted to be secured to the instrument panel I as by a suitable nut and washer assembly 51. Rotary adjusting knob 52 is secured to a tubular shaft 53, as by serrations or splines, and the shaft is freely turnable in a bore 54 of the housing and terminates at a reduced diameter portion 55 of the shaft having a pinion 56 tightly secured thereto. From the viewpoint of the driver, clockwise angular movement of the speed setting knob 52 from minimum speed position of the knob is the preferred direction for adjusting to increase governed speed. The pinion 56 meshes with a rack 57 above the pinion so that angular movement of the knob 52 moves a core or central wire portion 58 of the flexible shaft assembly to and fro. A conventional connector nut or thimble assembly (not shown) on a threaded extension 50a of the housing 50 supports one end of the usual sheaf or coiled wire and plastic cover assembly 59 forming a flexible guide for the core or wire 58 and in which the core or wire is movable freely. As shown in FIG. 2B the opposite end of the core or wire 58 is secured to a rack 60 having teeth in permanent engagement with a pinion 61 on the speeder spring adjusting shaft 21 in governor pilot valve housing 18.

Each of the toothed racks 57 and 60 is preferably circular in cross section (teeth made like screw threads but with zero pitch) so that the two ends of the flexible operating rod and rack assembly can be subjected to torque during installation or operation without causing any binding. The rack 60 (FIG. 2B) is assembled into place through the side of a more or less semi tubular extension 63 on the housing 18 and is held in place by a demountable plate 64. After installation of the control rod and rack assembly generally into place the teeth of rack 60 may be meshed with the pinion teeth in a turned position of the pinion 61 such that the arm 20b of the speeder is resting lightly upon the top of the pilot valve plunger. The speeder spring supporting rock shaft 21 can be turned by a suitable tool engaging slot 21a to move the speeder spring arm 20b to proper position during installation of rack 60 into place.

The rock shaft 21 FIGS. 2B, 3 and 5 for connection with the speeder spring 20 at its innermost convolution 20c FIG. 3 has an axially open slot 66 at its inner end and is of reduced diameter at 67 for holding said inner convolution 20c in position axially of the shaft. A diametrically inwardly bent end portion 68 of the speeder spring occupies the slot. Since the speeder spring is necessarily made of relatively light gauge leaf spring metal and it would be inconvenient to form the slot 66 as narrow as the thickness of the leaf, the bent anchoring end portion 68 is bowed transversely of the length of the leaf or so that in operative effect said end portion 68 is thicker than the metal of the leaf generally and fits the slot 66 snugly.

Since curves or turns of varying radius in different installations in the flexible sheath 59 can change the relative lengths of the sheath and flexible operating rod 58, an adjusting means compensating for such change is provided. This as shown at the right in FIG. 2B comprises an internally threaded sleeve 70 having a circular head portion 71 secured in position by the attaching plate 64 and a complementary threaded nipple 72 secured to the sheath 59. Thereby the sheath may in effect be lengthened or shortened as found necessary for freedom of operation of the rod and rack assembly.

*Friction Detent for Speed Adjusting Shaft*

In order to place a predetermined frictional restraint on the angular movement of the speed setting shaft 53, so that force stored in the speeder spring when adjusted to higher than minimum desired set speed positions will not cause displacement of the shaft 53 out of its manually set position, a coil spring friction brake 75 of generally known type is provided between the housing 50 and shaft 53. As shown a single helical metal friction coil spring 76 is fitted loosely into a socket 77 of the housing 50 adjacent to a bearing member 78 for the inner end of the shaft 53. The portion of the socket 77 shown in FIG. 4 is circular and larger than the relaxed outside diameter of the helical brake spring 76. The spring 76 is prevented from turning in the housing 50 by engagement of a toe portion 79 of the spring with an axial slot 80 formed in the housing 50. Instead of bearing directly against the shaft 53 for braking purposes (such as would allow turning in one direction only), the coil 76 is preloaded or in interference contact with an axially split bearing sleeve 81 of suitable relatively high friction material such as nylon composition which is thereby held in tight frictional engagement with the shaft.

Assuming the knob 52 is turned clockwise (driver's viewpoint) in order to set the governor for higher than minimum governing speeds such angular movement (assuming a right hand wound spring as illustrated in FIG. 4) will tend to cause an overrunning relative motion between the split bearing sleeve and the helical spring 76. Opposite or counterclockwise movement tending to be imparted by the pinion 56 by adjusted speeder spring torque is resisted by a much greater force than was required to turn the knob 52 clockwise due to self energizing coiling action of the helical spring on the bearing sleeve 81 as in spring clutches. However, since the spring does not directly engage the shaft 53 but instead grips the split friction sleeve 81, the holding or speeder-spring-position-retaining braking force exerted by the coil spring is definitely limited to a value which is easily predetermined by design. Angular movement of the knob 52 from a high speed setting into a low speed setting requires more force than from low toward high speed, but the action is smooth in both directions. Tendency to chatter during overrun such as is more or less inherent in spring clutches is damped by the nylon sleeve 81.

Make-Ready Relay

A very convenient position for the make-ready relay mechanism 30 which is electro-magnetically self retaining in contact closing position as more or less apparent from FIG. 1A, is at the inner end of the housing 50, so that the switch may be manually operated either to close or open its contacts as by provision of an operating stem 85 extending through the bore of the hollow shaft 53 and having a suitable knob or hand piece 86 at its outer end. A more or less conventional sheet metal housing 88 for the relay mechanism is attached to the housing 50 by an iron or steel adapter 89 which provides a bearing for the operating stem 85 and forms part of the flux path in respect to coil assembly MR and armature 91. The armature is normally spring biased outwardly away from the coil assembly as by a suitably insulated coil spring 92, and movement of the armature 91 against the force of the spring closes the contacts 31, 31a and 31b, as will be apparent when the holding coil MR is energized. The construction poses no difficult or unusual problem except maintenance of full freedom of movement for the armature 91. Therefore an entirely loose connection is provided between a head 85a on the stem and adjacent portions of the stem 85 and the armature 91. The socket 94 which receives the head and adjacent stem portion may be made like a key hole (not fully illustrated) being open at one side of the armature in order to facilitate assembly of it and contact member 31. Assembly is accomplished (assuming the knob 86 has not yet been attached to the stem 85) by removing the insulating cap 95 (and the contacts carried thereby) from the housing 88 and pushing the head 85a to the left out of the housing.

In the alternate make-ready relay mechanism assembly 30' according to FIG. 7 the contact member 31'' is shown as a stiff metal washer slidable on an insulation sleeve around a neck portion of the armature 91' so that yieldable contact closing force is applied as by a coil spring 97 reacting outwardly against a suitable insulating washer carried by the armature. An additional spring 98 between the mounting adapter 89 and the armature biases the latter to electrical contact opening position. The operating stem 85' in this case extends loosely through a bore 91'' of the armature, and its armature manipulating head 85a is movable to open the electrical contacts against an axial shoulder 99 formed by one or more inwardly turned lips, others of which are bent outwardly as at 99' to retain the spring 97 etc. Thus the stem 85' can be mounted in the housing 50 and adapter piece 89 solely for free sliding movement to close and open the electrical contacts while full freedom of axial movement of the armature is assured under all circumstances.

Air Valve Mechanism

Referring to FIG. 8, showing the preferred construction of the air valve 4, supper left FIG. 1, the coil assembly AV' is suitably mounted in a housing 100 containing a partition 101 forming with a closure member 102 a control valve chamber 104. The magnetically operated armature 105 has a spherically seated non-metallic valve plug 106 within the valve chamber and the core piece is spring biased to close the air conduit 25 as by a coil spring 107 in a socket 107' of the armature opposite from the valve plug. A reduced diameter portion 108 of the armature, carrying the plug 106, extends loosely through a coaxial opening in the partition 101, and the space above the partition is vented to atmosphere at 109. Thereby, during activation of the governor, when the two portions 25 and 25a of the vacuum conduit are intercommunicated by closing of the clicker-relay-dominated contact CR'', FIG. 1A, the connection of the valve chamber with atmosphere is shut off by the top face of the plug 106. When the valve plug 106 seats to close the vacuum conduit portion 25 and deactivate the governor, the pilot valve chamber 25b FIGS. 1 and 3 (hence servo 3), are immediately exposed to atmospheric pressure.

We claim:

1. In combination with an engine governor organized as a fluid pressure operated amplifier having a servo unit with output means adapted for connection to a speed control member of the engine and a pilot valve unit with a movable pilot valve member operating to control the motivating fluid in the servo unit and having different positions corresponding to different speeds, the pilot valve unit including speed-setting means acting in one direction on the pilot valve member and including speed detecting, force applying means arranged for action on the pilot valve member oppositely of the action of the speed-setting means, a speed responsive means adapted to transmit speed signals to the speed detecting means, a source of motivating fluid for the servo unit, and conduit means for the fluid connected via the pilot valve unit to the servo unit, the governor having an electrically operable device capable of rendering the governor active and inactive to control speed automatically, an electrical circuit and source of energy therefor, a switch in the circuit operative to control energization of the device, the switch comprising a contact element connected for movement by and with the movable pilot valve member, a cooperating contact element supported by a cantilever leaf spring mounted on a fixed support, and an adjusting device for the leaf spring comprising a pin mounted on said fixed support for angular movement on an axis transverse to the axis of movement of the pilot valve member, the pin having an eccentric portion bearing on the leaf spring to preload it in a position close to the two contacts.

2. In combination with an automatic speed governor in speed regulating association with an engine connected to drive an automotive vehicle having an engine accelerator device adapted for operation by a driver, means in the governor for setting the desired governing speeds, the governor having electrically operated governor activating means conditionally responsive to operation of the engine by the accelerator to bring the vehicle to predetermined speeds thereby to enable the governor to assume automatic control of the speed of the engine, a vehicle speed responsive device in the governor having positions peculiar to vehicle speeds approximately corresponding to the set speeds, an electrical circuit connected to energize the governor activating means, and a control switch in the circuit having two contact elements, one connected for movement by and with said speed responsive device and the other being supported by a spring, and an adjusting device for the spring bearing on the spring in a direction to separate the contacts, said adjusting device preloading the spring with approximately the minmium force necessary to cause circuit closure by the contacts.

3. In an automatic fluid operated speed regulating amplifier or servomechanism having a pilot valve unit and a servo which is spring biased for output movement in one direction, a source of motivating fluid pressure, the pilot valve unit including a valve body formed to provide a motivating fluid chamber adapted for fluid connection to the pressure source and to provide a valve chamber adapted for fluid connection with the servo for operating output movement thereof in opposition to the biasing direction, means forming an orifice between the said chambers, means forming another orifice between the valve chamber and a space externally of the valve case, a pilot valve plunger having a modulating valve face disposed to enter and variably restrict one of the orifices, a flexible support for the valve plunger guiding it for axial movement approximately coaxially of said one orifice while maintaining the valve face out of contact with the wall thereof during all valving movement of the plunger, speed sensing means acting on the valve plunger to move it axially in a speed increasing direction, speed setting means acting on the valve plunger and tending to move it in the opposite direction, an electrical circuit and source of energy therefor, means operated by the circuit to activate the governor and including a switch contact element connected to be moved as a function of movement of the pilot valve plunger when the plunger is moved by the speed sensing means in a direction to increase speed to a value established by the speed setting means, the switch further comprising a co-operating contact element carried by a leaf spring, the leaf spring being supported as a cantilever by the valve body remotely of the two contact elements, and a positioning device in supporting contact with the leaf spring between its cantilever support and the contact element carried thereby and maintaining the leaf spring in a predetermined preloaded condition by flexure thereof in a direction tending to move the contact elements apart.

4. In a speed governor for an engine having an air pressure source, said governor being organized and operating as a pneumatic amplifier and having a pilot valve unit and a servo unit controlled thereby, the servo unit having output means operatingly connected to a control member of the engine to cause variation of its speed, the pilot valve unit comprising a valve body, an air valve chamber in the body connected to the servo unit and an operating pressure chamber in the body adapted for connection to the air pressure source of the engine, means forming an orifice in the valve body between the valve chamber and the operating pressure chamber, means forming an orifice in the body between the valve chamber and an air space externally of the body, a pilot valve plunger having a modulating valve face in valving relationship to one of the orifices and swingable means supporting the plunger so that its valve face is out of contact with its associated orifice during valving movement of the plunger, speed establishing spring means acting on the valve plunger for axial movement of it in a speed increasing direction, speed sensing means acting on the valve plunger to move it axially in the opposite direction, an electrical circuit and a source of energy therefor, electrically operated means in the circuit connected to render the governor operative and inoperative, a switch in the circuit connected to control operation of the electrically operated means, the switch including a contact carried by the pilot valve plunger for movement therewith as a function of a predetermined speed sensing force thereon in opposition to the force of the speed establishing means, a cooperating contact carried by a cantilever leaf spring, and a positioning device for the leaf spring close to the contacts and bearing on the leaf spring in a direction to maintain the spring in a predetermined flexed preloaded condition and tending to maintain the contacts separated.

5. The governor according to claim 4, wherein the electrically operated means is a solenoid-operated air valve between the air pressure source and the operating pressure chamber of the pilot valve unit.

6. An electrical control system for an engine governor organized as a fluid pressure operated amplifier having a servo unit with output means adapted for connection to a speed control member of the engine and a pilot valve with a movable pilot valve member operating to control the motivating fluid in the servo unit, the pilot valve unit including speed-setting means acting in one direction on the pilot valve member and including speed detecting, force applying means arranged for action on the pilot valve member oppositely of the action of the speed-setting means, a speed responsive means adapted to transmit speed signals to the speed detecting means, a source of motivating fluid for the amplifier, and conduit means for the fluid connected via the pilot valve unit to the servo unit, a fluid control valve in the conduit means between said source and the pilot valve unit, an electric circuit and source of energy therefor, magnetically operated relay means including a relay coil in the circuit operative conditionally to cause opening of the fluid control valve, a normally open and manually closed magnetically locked in make-ready switch means in the circuit in series with the relay coil conditionally to enable energization of the relay coil, another normally open switch in the circuit in series with the relay coil, the last mentioned switch being connected for operation to close it by the movable pilot valve member when the speed detecting means receives a predetermined speed signal from said speed responsive means, the last mentioned switch thereby completing the circuit fo renergizing the relay coil to effect opening of the fluid control valve.

7. In an automotive vehicle having an engine with a speed control member and an accelerator device positionable by the vehicle driver and operatingly connected to the control member, an automatic governor having output means also operatingly connected to the control member and having a speed sensing means controlling the output means and a speeder spring biasing the speed sensing means, a speed setting hollow shaft remotely of the governor in a position available to the driver and connected to vary the biasing force of the speeder spring, an electrical circuit including electrically operable means connected to activate the governor, a governor operated switch in series therewith in the circuit, and a make-ready relay mechanism including a coil coaxial with the hollow shaft, an armature movable in the coil along the axis of the shaft and electrical contacts connected to be held closed by the armature when the coil is energized whereby conditionally to establish a portion of the circuit, an operating stem slidable freely within the hollow shaft and adapted for manipulation by the driver, the operating stem being guided by the hollow shaft for substantially free movement along the axis of the shaft, the stem having a radially loose push-and-pull connection with the armature such as to enable the armature to be moved to contact-closing and contact-opening positions by the stem while enabling the armature to move axially while free from frictional restraining contact by the stem.

8. In combination with an automatic speed governor in speed regulating association with an engine connected to drive an automotive vehicle having an engine accelerator device adapted for operation by a driver and having electromagnetically operable governor activating means to enable the governor automatically to assume control of the speed of the engine, means in the governor for setting the desired governing speeds and acting upon a vehicle speed detecting means in the governor which is moved automatically into different positions peculiar to vehicle speeds corresponding approximately to the set speeds, an electrical control circuit operatingly connected to the governor activating means, an electromagnetically operable signal device having a movable part exposed in a position to be readily viewed by the driver only when the signal device is energized, and a switch in the circuit connected to be moved to energize the governor activating means and signal device as a function of movement of the speed detecting means into one of its said positions.

9. The mechanism according to claim 8 wherein the electromagnetically operable signal device, when energized, produces sound as an additional signal message.

10. In combination with a governor having a speeder spring capable of setting the speed of governed operation, an angularly adjustable shaft remotely of the governor and connected to vary the force of the speeder spring incident to angular manipulation of the shaft, a stationary housing around the shaft, and a two-way acting helical braking spring secured at one end to the housing and free therefrom at its other end, and a radially resilient sleeve in frictional contact with the shaft and on which coils of the spring are preloaded.

11. In combination with a governor having a speeder spring and a fixed housing carrying an angularly movable member connected to vary the effective force of the speeder spring to set the governing speed, a fixed housing remotely of the governor housing and carrying an angularly movable member manipulatable to set speed, pinions on the angularly movable members respectively, racks guided by the respective housings in mesh with associated pinions, and a flexible push-and-pull shaft assembly including a substantially inextensible flexible rod and a flexible casing guiding the rod, and length compensating means including coaxial sleeves screw threaded together and relatively rotatable during assembly, one sleeve being secured to one of the housings and the other sleeve to the flexible casing.

References Cited in the file of this patent

UNITED STATES PATENTS

| | | |
|---|---|---|
| 2,887,998 | Thorner | May 26, 1959 |
| 2,916,100 | Teetor | Dec. 8, 1959 |
| 2,925,066 | Thorner | Feb. 16, 1960 |